United States Patent [19]
Garbe et al.

[11] Patent Number: 5,530,661
[45] Date of Patent: Jun. 25, 1996

[54] DATA BIT-SLICING APPARATUS AND METHOD FOR COMPUTING CONVOLUTIONS

[75] Inventors: Olivier Garbe, San Mateo; Christopher Mills, Santa Clara, both of Calif.

[73] Assignee: Winnov, Sunnyvale, Calif.

[21] Appl. No.: 318,461

[22] Filed: Oct. 5, 1994

[51] Int. Cl.⁶ .................................................... G06F 17/10
[52] U.S. Cl. ............................... 364/728.01; 364/724.16; 364/749; 364/750.5
[58] Field of Search ................... 364/728.01, 724.16, 364/724.12, 749, 750.5

[56] References Cited

U.S. PATENT DOCUMENTS

| | | | |
|---|---|---|---|
| 4,380,046 | 4/1983 | Fung | 364/200 |
| 4,418,383 | 11/1983 | Doyle et al. | 364/200 |
| 4,800,517 | 1/1989 | Asghar et al. | 364/749 |
| 4,860,248 | 8/1989 | Lumelsky | 364/900 |
| 4,864,562 | 9/1989 | Murakami et al. | 370/84 |
| 4,931,973 | 6/1990 | Asghar et al. | 364/724.16 |
| 5,014,235 | 5/1961 | Morton | 364/900 |
| 5,053,985 | 10/1991 | Friedlander et al. | 364/725 |
| 5,117,385 | 5/1992 | Gee | 364/724.16 |
| 5,130,792 | 7/1992 | Tindell et al. | 358/85 |
| 5,131,057 | 7/1992 | Walowit et al. | 382/41 |
| 5,138,459 | 8/1992 | Roberts et al. | 358/209 |
| 5,157,395 | 10/1992 | Del Signore et al. | 341/143 |
| 5,191,548 | 3/1993 | Balkanski et al. | 364/725 |
| 5,197,140 | 3/1993 | Balmer | 364/749 |
| 5,210,705 | 5/1993 | Chauvel et al. | 364/572 |
| 5,212,777 | 5/1993 | Gove et al. | 395/375 |
| 5,226,160 | 7/1993 | Waldron et al. | 395/650 |
| 5,239,654 | 8/1993 | Ing-Simmons et al. | 395/800 |
| 5,241,492 | 8/1993 | Girardeau, Jr. | 364/736 |
| 5,307,456 | 4/1994 | MacKay | 395/154 |
| 5,309,434 | 5/1994 | Maekawa | 370/62 |
| 5,369,606 | 11/1994 | Hessel | 364/724.16 |
| 5,379,242 | 1/1995 | Rose et al. | 364/724.16 |

*Primary Examiner*—David H. Malzahn
*Attorney, Agent, or Firm*—Blakely, Sokoloff, Taylor and Zafman

[57] ABSTRACT

A computer architecture that can rapidly perform a variety of repetitive mathematical operations on multimedia data sets comprises a data processing engine having n data processing devices, each of which includes shift registers and multiplexers for organizing input data into bit slices such that each of the n data processing devices can receive one bit of information from n data samples. Look-up operations are performed in a table memory of each of the n data processing devices on a bit slice, the table memory containing all possible combinations of a constant function. The results of the look-ups are shifted and accumulated to simultaneously generate multiple outputs of a convolution of an input function with the constant function. A data path provides information transfer between each of the n data processing devices.

16 Claims, 6 Drawing Sheets

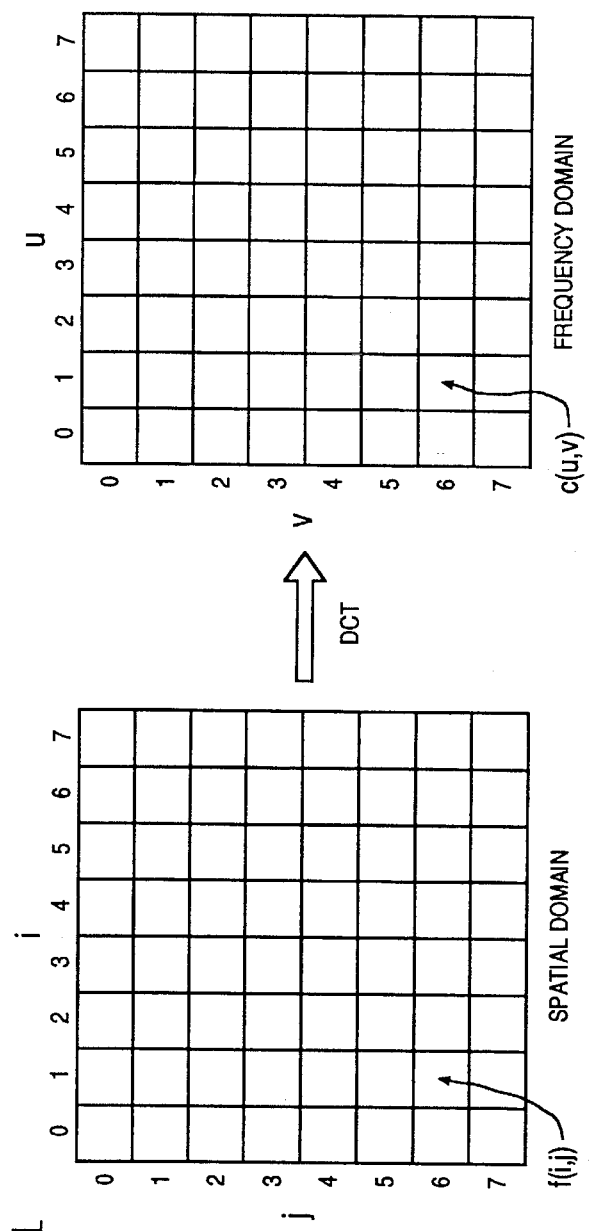
FIG_1
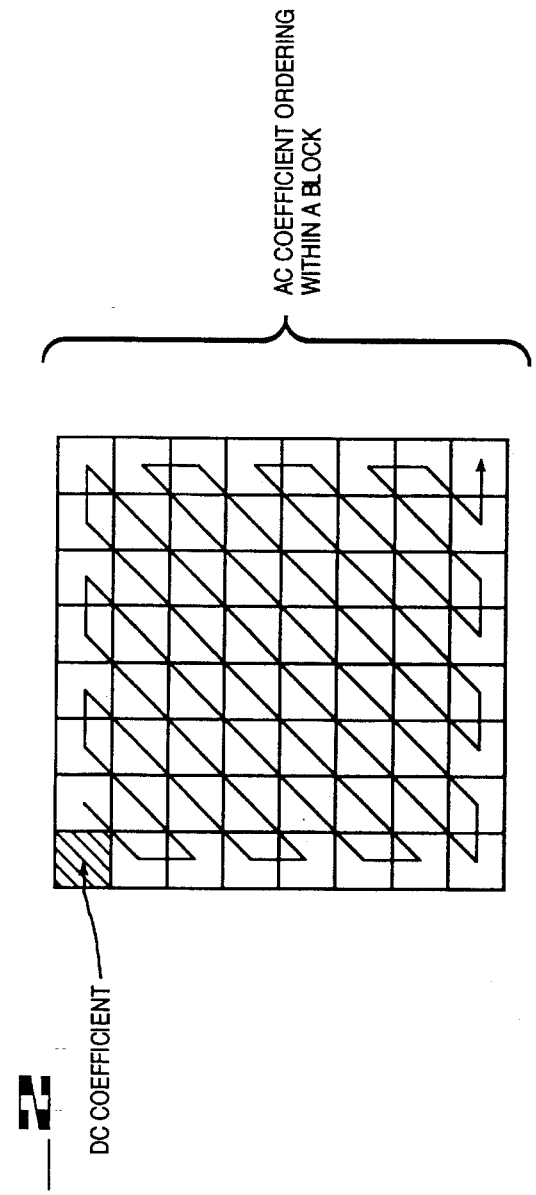
FIG_2

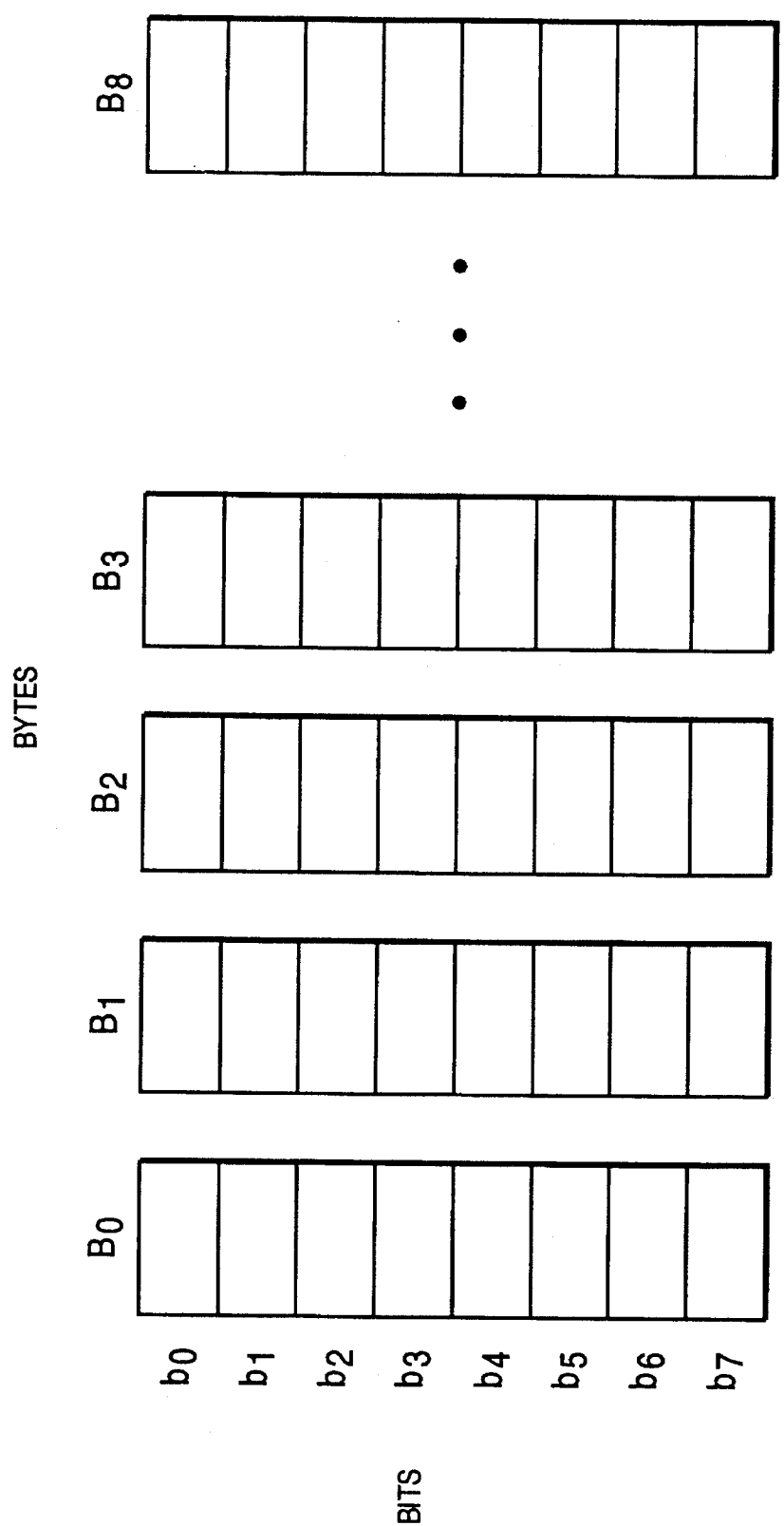
FIG_3

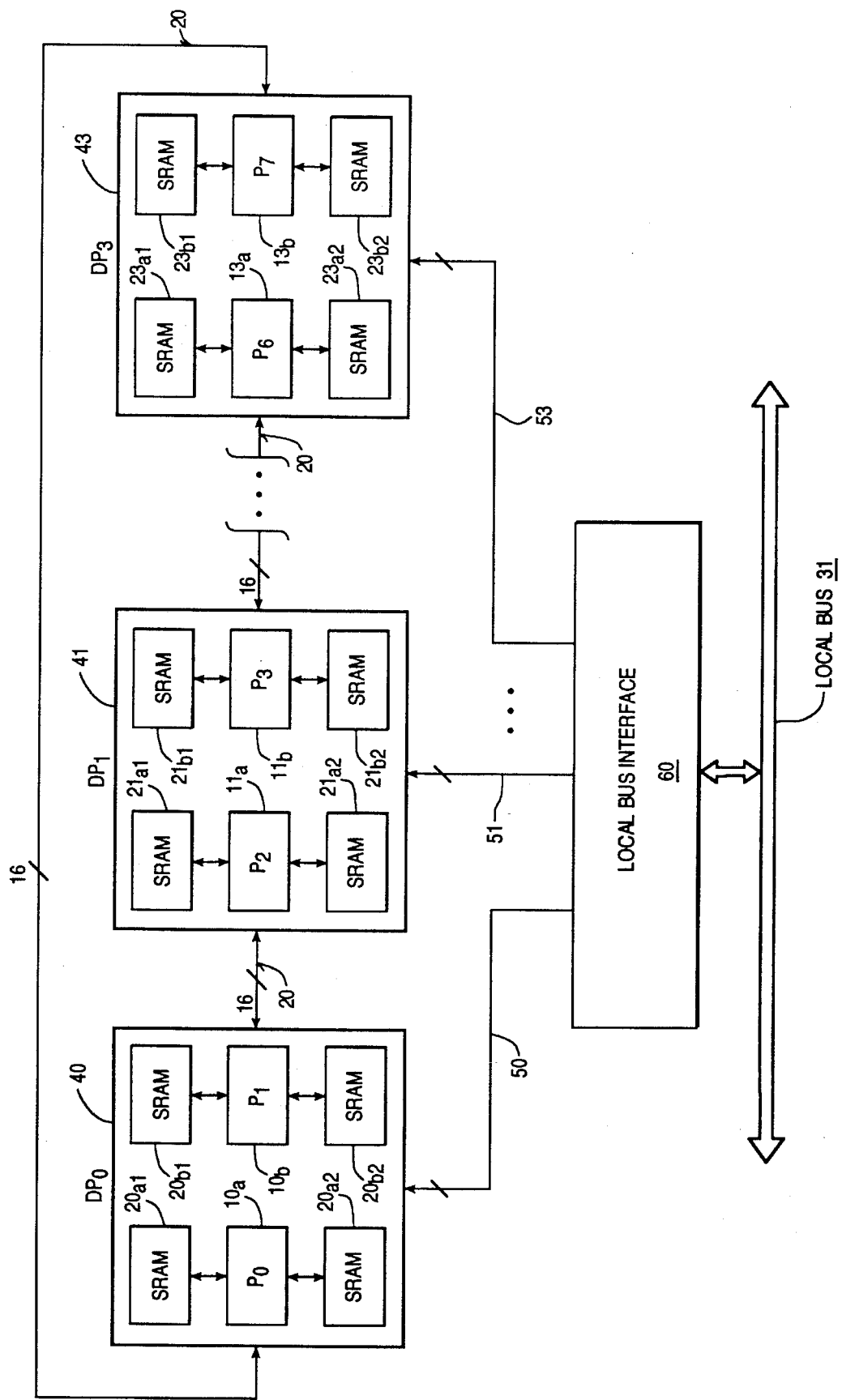
FIG_4

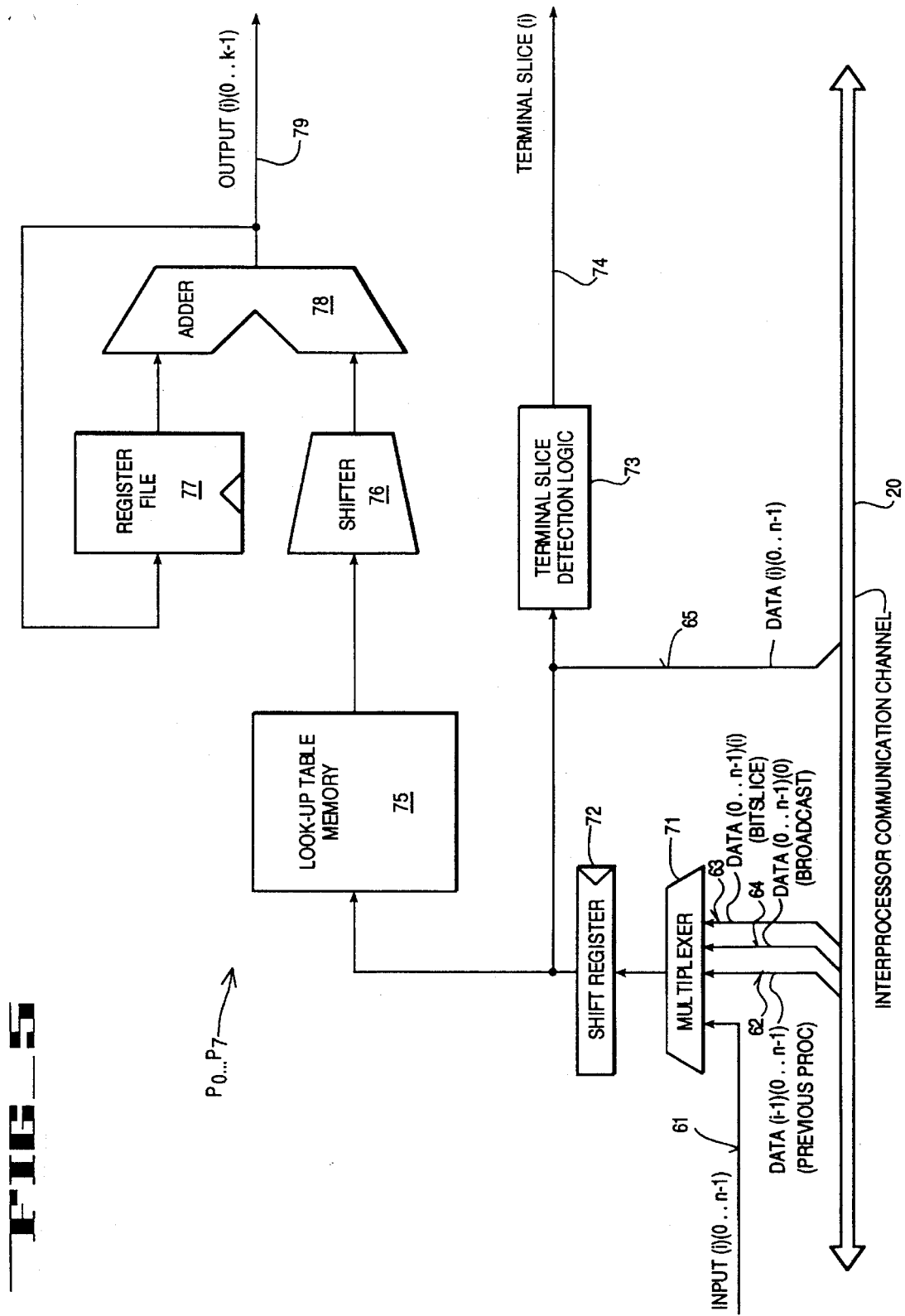
FIG_5

FIG_6

| Processor | R2 | R1 | R0 |
|---|---|---|---|
| P0 | x | | |
| P1 | x x x x | | |
| P2 | x x x x x x x | x | |
| P3 | x x x x x x x x | x x x | |
| P4 | x x x x x x x x | x x x x x | x |
| P5 | x x x x x x x | x x x x x x x | x x x |
| P6 | x x x x x x | x x x x x x x x | x x x x x |
| P7 | x x x x x | x x x x x x x x | x x x x x x x |

$IN_{0-7}$  $IN_{8-15}$  $IN_{16-23}$  $IN_{24-31}$ ...
              $OUT_{0-7}$   $OUT_{8-15}$ ...

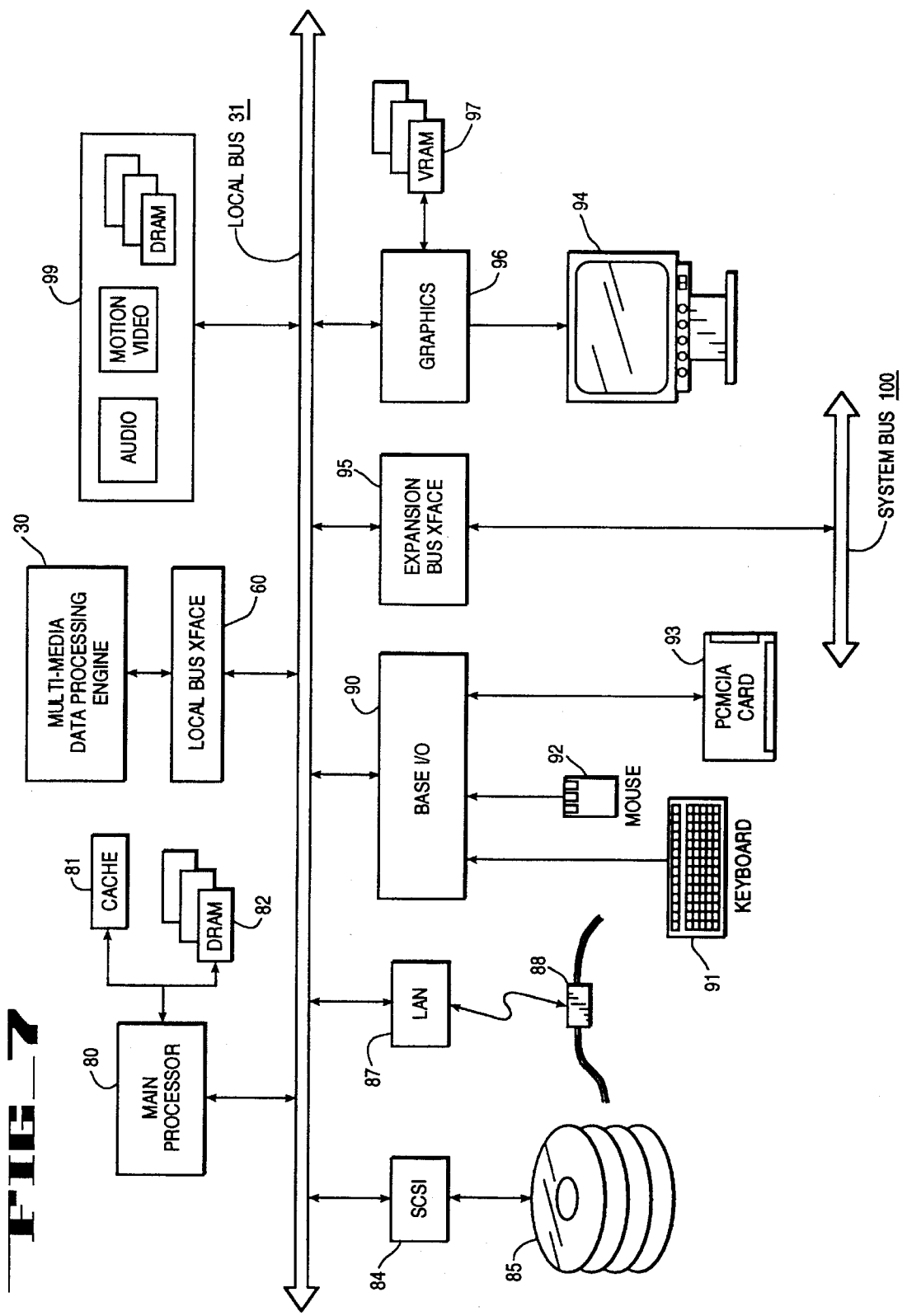

DATA BIT-SLICING APPARATUS AND METHOD FOR COMPUTING CONVOLUTIONS

FIELD OF THE INVENTION

The invention relates generally to the field of data processing and to semiconductor devices for performing arithmetic operations on large amounts of data. More particularly, the invention relates to apparatus and methods for implementing basic arithmetic and conversion operations on coded data used in graphics and image processing, audio and video compression and decompression, handwriting and speech recognition, and data communications across various networks.

BACKGROUND OF THE INVENTION

The general trend in the computer industry has been towards the development of computer products which integrate a variety of different communications media. An assortment of products and standards now exist which combine various media resources such as color video, digital audio, motion pictures, and computer graphics. Several examples of state-of-the-art integrated multimedia architectures and systems are found in U.S. Pat. Nos. 5,307,456, and 5,226,160. Communication systems and apparatus for efficient transmission of multimedia information are also described in U.S. Pat. Nos. 5,309,434 and 4,864,562.

One of the difficulties of processing and communicating multimedia information is the enormous amount of data that must be manipulated, and on which, numerous arithmetic operations must be performed. For example, a typical multimedia system must be capable of capturing, digitizing, compressing, decompressing, enhancing and reproducing moving video images and accompanying audio signals. The formidable problems which must be overcome in designing systems for storage, processing, communication, and retrieval of multimedia data has lead engineers and scientists to consider a wide variety of solutions.

To fully appreciate the magnitude of the problem faced by practitioners, consider the fact that digitized video images normally comprise a two-dimensional array of picture elements, or pixels. Standard video displays normally consist of an array of 640 horizontal pixels by 480 vertical pixel lines. Of course, the quality of the image is a function of its resolution, which is a direct function of the number of horizontal and vertical pixels. This means that the resolution of an image on a display area is directly related to the amount of memory required to store the image.

A typical full color video image requires 24-bits per pixel. This allows 8-bits to be assigned for each of the three primary colors (i.e., red, green, and blue) resulting in $2^8 \times 2^8 \times 2^8$—or approximately 16.7 million possible colors in a single pixel. As a consequence, over one million bytes (1MByte) of memory is usually required to display a full color video image. If video motion is to be added to the display—for example in a NTSC video application—each video frame must be displayed 30 times a second. Therefore, to display 60 seconds of motion video on a computer monitor screen requires approximately two gigabytes (2 GBytes) of memory.

The rate at which data must be retrieved in order to display video motion sequences is on the order of 30MBytes per second. If digital audio is also included in the multimedia communications system an additional 180 kilobytes (KBytes) of data per second must be transmitted. These data transfer rates vastly exceed the capabilities of existing data storage devices.

For example, contemporary rigid disk drives are capable of transferring approximately 1MByte of data per second. Because multimedia information is extremely number intensive and involves the processing of enormous amounts of data at extremely high data transfer rates, various techniques have been developed aimed at compressing the data. A number of different compression techniques and algorithms are known to reduce the amount of data that needs to be manipulated or transmitted while maintaining a high standard of video/audio fidelity.

By way of example, an algorithmic technique developed by the Joint Photographic Expert Group (JPEG) has proven successful in reducing the amount of data by a factor of approximately twenty for still picture compression. The JPEG algorithm has a reputation for providing high quality still picture compression; that is, the JPEG algorithmic technique allows a significant reduction in the amount of data that is needed to represent a still, video image. The JPEG algorithm achieves this result by eliminating information to which the human eye is relatively insensitive.

Another algorithmic technique developed by the Moving Pictures Experts Group (MPEG) provides a very high level of compression for moving pictures and associated audio for digital storage at about 1.5 megabits per second. This technique is commonly known as the MPEG algorithm. The MPEG algorithm involves the compression of data which exhibits certain spatial and temporal relationships. An MPEG bit stream is made up of three types of pictures: Intra Pictures (I) which are coded independent of any of the other pictures, Predicted Pictures (P) which are coded using motion compensation from previous or future pictures, and Bi-directional predicted pictures (B) which are coded using motion compensation from a previous and future I or P pictures.

In comparison to the JPEG algorithm, which simply reduces the amount of data by recognizing differences between neighboring pixels, the MPEG algorithm takes into account relations and differences between successive video frames. The MPEG algorithm is therefore useful in compressing data involving the displacement of an object in successive video frames in relation to a pixel coordinate axis.

Yet another technique for video compression and decompression is known by practitioners in the art as H.261 (P×64).

Audio compression and decompression does not require as much bandwidth as video in most applications (e.g., teleconferencing or voice playback), but it is still important to be able to code and decode an audio or voice data stream in real-time. Various algorithms, such as sub-band coding, Linear Predictive Coding (LPC) and Wave Table Synthesis (WTS) have been studied for use in the compression, decompression and synthesis of audio information.

A common characteristic of these standard algorithmic techniques is that they are all "transform-based"; that is, they rely upon the use of the Discrete Cosine Transform (DCT). (MPEG and H.261 also use Motion Estimation/Motion Compensation to compress and decompress video data streams.) Most all of the algorithms and techniques for achieving high quality audio and video compression/decompression, graphics and image processing, handwriting and speech recognition, and modem communications have one very important common characteristic: they are extremely computationally intensive, involving extensive multiply-accumulate loops.

By way of example, the discrete cosine transform is frequently implemented in a computer as a sequence of multiplications and additions performed on the image data in one or more dimensions. Thus, the fundamental operations required for convolution and correlation of pixel data are matrix multiplication and addition. Other common characteristics of multimedia applications include: small native data elements (e.g., bytes, words, etc.), computationally intensive inner loops (e.g., DCT, Motion Compensation), regular data structures (e.g., one and two-dimensional pixel arrays), and execution of a small number of repetitive operations performed on large amounts of data (e.g., additions, multiplications, shifts). As a result, the long-felt, unsatisfied need in the field of multimedia computing has been for a data processing architecture that is capable of performing computationally-intensive operations, involving huge amounts of data, in real-time.

Conventional scalar microprocessors, such as those manufactured by Motorola, Inc., and Intel Corporation, perform matrix multiplications and matrix additions sequentially. By way of example, to perform a matrix multiplication operation traditional general purpose microprocessors normally first compute a pair of addresses, then fetch the individual data elements that are to be multiplied. The product of the matrix and vector elements is then stored in a temporary location on-chip. The multiplication process is repeated for each matrix and vector element until the entire matrix multiplication has been completed.

Attempts to reduce the number of multiplications and additions that must be performed on video/audio data during the compression and decompression processes has resulted in a variety of specialized circuits and processing techniques. For instance, U.S. Pat. No. 5,053,985 describes an integrated circuit that attempts to optimize the physical mathematical apparatus required to perform discrete cosine transforms commonly used in the compression of digital image data. A computer system for compression and decompression of video data using DCT algorithmic techniques is also disclosed in U.S. Pat. No. 5,191,548.

Another approach to the problem of achieving real-time video processing speeds has been the concept of single-instruction, multiple-data (SIMD) processors. SIMD machines are generally characterized as consisting of an group of processors that perform the same operation simultaneously on every element of a data array. Multiprocessors that employ additional instruction memories dedicated as cache memories to particular processors to allow processors to function in a multiple-instruction, multiple-data (MIMD) mode have also been utilized to process large data arrays. Examples of SIMD and MIMD architectures for use in digital filtering applications are described in U.S. Pat. Nos. 5,210,705, 5,239,654 and 5,212,777. Despite the fact that SIMD and MIMD processors are capable of manipulating large amounts of data rapidly, they generally suffer from the drawback of having relatively slow input/output (I/O) speeds. In addition, many existing SIMD and MIMD architectures are not generalized enough to implement all of the various algorithms and techniques that need to be efficiently executed in a multimedia data processing system.

Computer architectures that includes a plurality of pixel slice processors are also known in the prior art. For example, U.S. Pat. No. 4,860,248 describes a pixel slice processor that accomplishes SIMD operation on pixel lines which are equal to or larger than the bit capacity of a computer. Traditional bit-slice architectures, as exemplified by the Advanced Micro Devices 2900 family of processors, allow some data processing to occur on a nibble granular basis (e.g., on a multiple of 4 bits) but suffer from the inability to work across multiple data words. Moreover, existing bit-slice architectures usually perform mathematical operations sequentially, rather than in parallel. Another serious drawback of existing pixel or bit-slice architectures is the complex interconnection network and control structure that is required.

Convolution memory chips, such as that described in U.S. Pat. No. 5,014,235, have demonstrated their usefulness in performing dot product matrix multiplications. Dot product matrix multiplications are routinely performed in certain types of neural networks or associative memories for the purpose of matching sets of data (e.g., pattern recognition). The problem with the use of convolution memory chips, however, is that they are not of general useful in multimedia, real-time data processing applications that require implementation of a number of different processing algorithms at very high data rates.

What is needed then is a computer architecture that takes advantage of the statistical similarities of multimedia data and which can rapidly perform a variety of repetitive mathematical operations on very large data sets for the purpose of finding similarities between different functions. As will be seen, the present invention provides an apparatus and method for efficient processing of multimedia data. The invented data processing system is capable of calculating very complex functions on large data arrays at extremely high data rates. Moreover, the invented architecture is very flexible and adaptive so as to implement a wide variety of different processing algorithms and techniques useful in multimedia applications.

BRIEF DESCRIPTION OF THE DRAWINGS

The present invention will be understood more fully from the detailed description which follows and from the accompanying drawings, which, however, should not be taken to limit the invention to the specific embodiments shown, but rather are for explanation and understanding only.

FIG. 1 illustrates a discrete cosine transform (DCT) of an 8×8 block of coefficients.

FIG. 2 illustrates the AC coefficient ordering within an 8×8 block of discrete cosine transform coefficients.

FIG. 3 is a simplified diagram illustrating data organization in the processor architecture of the present invention.

FIG. 4 is a circuit schematic in block diagram form which shows the basic data processing architecture of one embodiment of the present invention.

FIG. 5 illustrates one embodiment of a data processing element of the present invention.

FIG. 6 shows bit-slice data flow for a convolution example according to one embodiment of the present invention.

FIG. 7 illustrates a multimedia data processing system in accordance with the present invention.

SUMMARY OF THE INVENTION

The present invention comprises a data processing system for processing multimedia data involving a convolution of an input data vector. The convolution takes the input data stream and convolves it with some sort of filtering function, producing an output data stream. The length of the input and output data streams are arbitrary. For example, the streams could represent continuous digitized audio or video data.

In digital filter terminology, the variable n may be used to refer to the number of taps in the filter, e.g., a 7 tap digital filter consists of convoluting an input data stream with a filter which consists of 7 coefficients. The convolution operation involves generating a given output by performing a sum of products of the filter coefficients with the input data stream. Where the convolution is performed on k-bit data, an input data vector $IN_0, IN_1, \ldots IN_{n-1}$ represents n elements of an input data signal, and each of the n elements is represented as $$IN_i = 2^0 \times IN_i(0) + 2^1 \times IN_i(1) + \ldots \pm 2^{k-1} \times IN_i(k-1)$$

Convolution produces an output data vector, expressed as $$OUT_i = (A_0 \times IN_i) + (A_1 \times IN_{i+1}) + \ldots + (A_{n-1} \times IN_{i+n-1})$$

where $A_0, A_1, \ldots, A_{n-1}$ represent a constant vector and where i, k, and n are integers.

Consider a simple example in which an input data stream $$IN_0 = 45 \quad IN_1 = 49 \quad IN_2 = 56 \quad IN_3 = 63 \quad IN_4 = 71 \quad IN_5 = 90$$

is applied to a 3-tap filter having coefficients $$A_0 = 0.25 \quad A_1 = 0.50 \quad A_2 = 0.25$$

Ignoring what happens at the boundaries of the convolution (i.e., at the end of the input data stream), the resulting output is

| | | | |
|---|---|---|---|
| $45 \times 0.25 +$ | $49 \times 0.25 +$ | $56 \times 0.25 +$ | $63 \times 0.25 +$ |
| $49 \times 0.50 +$ | $56 \times 0.50 +$ | $63 \times 0.50 +$ | $71 \times 0.50 +$ |
| $56 \times 0.25 =$ | $63 \times 0.25 =$ | $71 \times 0.25 =$ | $90 \times 0.25 =$ |
| $OUT_0 = 49.75$ | $OUT_1 = 56$ | $OUT_2 = 63.25$ | $OUT_3 = 73.75$ |

The apparatus and method of the present invention performs this convolution by taking bit-slices of the data. For a simplified understanding of the invented procedure, assume that the number of taps in the filter is equal to the number of bits in the input data stream (i.e., k=n). (In situations where the number of taps is less, zeros can be inserted into the output. If the number of taps is greater, the filter can be broken up into multiple k-tap filters and the outputs can be summed together.) Further assume that k=n=8 (i.e., an 8-tap filter on 8-bit data).

In accordance with one embodiment of the invention, n processors are employed in a data processing engine, with each processor taking a single bit from each of the input samples. Continuing with the above example, the first 8 input samples are bit-sliced in the present invention as follows:

$$SLICE_0 = 2^0 \times IN_0(0) + 2^1 \times IN_1(0) + \ldots + 2^7 \times IN_7(0)$$
$$SLICE_1 = 2^0 \times IN_0(1) + 2^1 \times IN_1(1) + \ldots + 2^7 \times IN_7(1)$$
$$\ldots$$
$$SLICE_7 = 2^0 \times IN_0(7) + 2^1 \times IN_1(7) + \ldots + 2^7 \times IN_7(7)$$

By way of example, if the input data is $$IN_0 = 10010101 \quad IN_1 = 11011100 \quad IN_2 = 01001011 \quad IN_3 = 11111001$$

$$IN_4 = 00101111 \quad IN_5 = 01101011 \quad N_6 = 00001010 \quad IN_7 = 01011011$$

bit-slicing produces the following:

$$SLICE_0 = 10111101 \quad SLICE_1 = 11110100 \quad SLICE_2 = 00010011 \quad SLICE_3 = 11111110$$

$$SLICE_4 = 10001011 \quad SLICE_5 = 00111000 \quad SLICE_6 = 10101110 \quad SLICE_7 = 00001011$$

Next, a look-up is performed for each slice in a $2^k$-entry table which contains all the possible summations of the elements of the filter vector A. For the case where n=k, the table is constructed so that if bit j is set in the binary representation of the table index, then the vector element $A_j$ is added in the summation.

In a more generalized mathematical description of one embodiment of the present invention, a sequence of data slices is provided in which k/n bits of input data produce a first slice, represented as $$SLICE_0 = 2^0 \times IN_i(0) + 2^1 \times IN_i(0) + \ldots + 2^{n-1} \times IN_i(0)$$

with a second slice represented as $$SLICE_1 = 2^0 \times IN_i(1) + 2^1 \times IN_i(1) + \ldots + 2^{n-1} \times IN_i(1)$$

The sequence of data slices continues up to a nth slice represented as $$SLICE_{n-1} = 2^0 \times IN_i(k-1) + 2^1 \times IN_i(k-1) + \ldots + 2^{n-1} \times IN_i(k-1)$$

For each slice of the sequence, a look-up is performed in a $2^k$-entry table stored in a memory of a data processor device. The table contains all of the possible summations of the constant vector such that each look-up results in the convolution of one slice of the input data vector with the constant vector. A scaled summation of the sequence of look-up values is then performed to generate the output data vector.

DETAILED DESCRIPTION

The present invention relates to a data processing architecture which takes advantage of the statistical nature of multimedia data to perform a wide range of computationally intensive algorithmic operations on large data sets quickly and efficiently.

Notation And Nomenclature

In the following description, numerous specific details are set forth such as functional blocks representing data processing devices or networks, configurations, etc., in order to provide a thorough understanding of the present invention. However, it will be apparent to one skilled in the art that the present invention may be a practice without these specific details. In other instances, well-known circuits, structures, and methods of operations are not described in detail in order to avoid unnecessarily obscuring the present invention.

Some portions of the detailed description which follows are presented in terms of algorithms and symbolic mathematical representations of operations on data bits within a computer data processing device or computer memory. These algorithmic descriptions and representations are the means used by those skilled in the data processing arts to most effectively convey the substance of their work to others similarly skilled in the art.

An algorithm here is generally set forth to represent a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated within a machine. It is convenient at times, principally for reasons of common usage, to refer to these signals as bits, bytes, values, elements, symbols, characters, terms, numbers, or the like. It should be remembered, however, that all of these and similar terms are to be associated with the appropriate physical quantities, and merely convenient labels applied to these quantities.

Furthermore, the manipulations performed are often referred to in terms, such as adding, comparing, multiplying, etc., which are commonly associated with mathematical or mental operations. It should be borne in mind, however, that the capability of a human to perform these operations is unnecessary or undesirable as herein described as part of the present invention. These mathematical operations are performed in accordance with the present invention using digital data processing devices, or other similar devices. It should be kept in mind when reading the following description that the present invention relates to both apparatus and method steps for operating a data processing device by generation and manipulation of physical signals representing multimedia information.

Overview

Traditional processing, storage, and retrieval of multimedia information involves intensely repetitive arithmetic computations and manipulations that must be performed on gargantuan amounts of data. As explained earlier, a typically color video requires data rates of approximately 30MBytes per second, whereas audio signals are generally processed at data rates of about 180 KBytes per second. In order to efficiently store and retrieve these large amounts of multimedia data from non-volatile memories such as disk drives, the information must necessarily be compressed. A variety of well-known algorithms are known which facilitate both compression and decompression of large data sets.

Depending on the particular type of data being processed (e.g., graphics, video images, moving pictures, audio, voice, etc.) different compression algorithms may be chosen over others. For example, the JPEG algorithm is often selected for encoding still picture color information at high compression ratios in order to maintain a high quality image. On the other hand, if motion video pictures are to be compressed, stored, and retrieved, then the MPEG algorithm would probably be preferred since it takes into account the temporal relationships of data. In still other instances, techniques such as sub-band coding, linear predictive coding and wave table synthesis might be chosen for processing of audio data.

Different types of compression algorithms are based on different mathematical formulas and prediction techniques. For example, one class of compression algorithms primarily intended for lossless and nearly lossless data coding is based on spatial prediction techniques and utilizes differential pulse code modulation methods. Another class of compression algorithms is based on the two-dimensional discrete cosine transform (DCT). DCT-based algorithms are used for their good energy compression properties by many picture compression schemes, e.g., MPEG and JPEG.

Image data is conventionally divided into 8×8 blocks of pixels. FIG. 1 illustrates the DCT algorithm transforming an 8×8 pixel array (i.e., spatial domain) into an 8×8 array of DCT coefficients (i.e., frequency domain). The transformed coefficients may then be quantized. One important property of DCT is that it concentrates most of the energy of a picture in the low frequency coefficients. Another way of thinking of the DCT algorithm is as a convolution algorithm that tries to minimize a function in order to determine the amount of correlation between two images, curves, pixels, etc. The present invention quantizes the low frequency components using a finer scale than the high frequency components, which correspond to the features the eye is less sensitive to, in order to reduce the number of computations required.

A Novel Method for Computing Convolution Functions

Recognizing that there exists a natural similarity between adjacent pixels in any given block of pixels representing an image, the method of the present invention normalizes the spatial domain data by subtracting the minimum or average value from each element of a block, and organizing the reduced data in a bit-slice fashion for easy transformation processing. Bit-slice data organization facilitates matrix transposition of the spatial data blocks to generate vectors of rows. That is, columns of 8-bit, single bytes (e.g., bits $b_{0-7}$ of byte $B_0$) are transposed into rows of 8 bits across 8 bytes (e.g., bits $b_0$ of bytes $B_{0-7}$). Following quantization, the number of data slices (e.g., pixel slices) that must be processed is reduced, which greatly increases the multimedia data processing efficiency of a computer system.

Since the variation between values in the pixel block is usually small, it is possible to suppress the minimum value to reduce the amount of data that must be processed. In accordance with the data processing engine of the present invention, the minimum value of a data array is first calculated. This minimum value is then subtracted from all of the other values in the pixel array. In this way, the minimum value applies to all of the data so that most of the coefficients in the DCT block end up having either a zero or a near-zero value.

After suppression of the minimum or average value, the multimedia data is organized for easy manipulation such that neighboring data or pixel items which are strongly correlated can be implemented as a simple look-up function. On the other hand, data which is uncorrelated simply gets added.

FIG. 2 illustrates the ordering convention for an 8×8 array of DCT coefficients. Note that DCT coefficients are most often in decreasing variance order along the zig-zag line. In FIG. 2, the upper left most coefficient represents the DC, or average, component of the block. The AC coefficients are ordered in a zig-zag fashion within the block. With the DC component in the upper left hand corner, increasing horizontal "frequencies" are represented by the coefficients to the right. Similarly, increasing vertical frequencies are represented by the coefficients going down the array to the left.

Each of the various frequency components of an exemplary 8×8 array of DCT coefficients are shown graphically in Appendix A, and numerically in Appendix B. By way of example, the notation C(0,0) represents the DC coefficient for the exemplary 8×8 block. As shown, the DCT coefficient C(0,0) is represented graphically by a flat, uniform image. Numerically, the DC coefficient is a constant.

Considering further the three-dimensional graphical representations illustrated in Appendix A, the magnitude of a particular wave pattern indicates the amount of energy of that particular frequency component within the 8×8 pixel block. The first AC component of the DCT (looking at the waveform in the vertical direction) is given by the component C(0,1). Likewise, the first AC component of the DCT in the horizontal direction is given by C(1,0). The coefficient C(1,1) provides the first frequency component along the diagonal direction of the 64 coefficient array. The highest frequency component in Appendix A is represented by C(7,7).

To better understand the representations in the Appendixes, suppose that an 8×8 block of pixels taken from an image is completely uniform; that is, all of the 64 pixels have the same value, e.g., 255. Such a pixel array translates in the frequency domain to an array of DCT coefficients wherein the DC coefficient, i.e., C(0,0), has a value equal to 255, and all of the remaining 63 AC coefficients, i.e., C(0,1), C(1,0), ... C(7,7), have a value of zero.

As discussed earlier, one of the properties of the DCT is that it concentrates the energy of the 64 samples contained within an 8×8 block of data into only a few of the 64 transform coefficients. In other words, images (or other types of communications signals) rarely occur in which one data element is opposite or totally uncorrelated to its neighboring data element. This means that the energies represented by the DCT coefficients tend to rapidly approach zero as the ordering of AC coefficients increases along the zig-zag line (i.e., from 1 to 63).

If the entire 8×8 pixel array has a constant value, then the DC coefficient will be non-zero, and all of the AC coefficients will be zero. Variations from a constant value in the pixels of the 8×8 block will generally introduce non-zero values in some—but in most cases not all—of the remaining 63 AC coefficients. The present invention takes advantage of the statistical similarity of most multimedia data to provide an architecture that can process multimedia data in a fast, efficient manner.

In one aspect of the invention this is accomplished by suppressing the minimum value and then bit-slicing the pixel data (spatial domain) horizontally. In the spatial domain, the number of data components is usually very large. Once the minimum or average pixel value is subtracted from each of the pixel elements only small differences, representing image variations between neighboring pixels, remains. This drastically reduces the number of multimedia data bits that must be processed due to the fact that the number of data slices that must be processed decreases in direct proportion to the uniformity of the data.

Stated in another way, the number of data slices that must be processed in accordance with the present invention is related to the frequency variations of the pixels. In the normal situation where the multimedia data being processed is highly correlated (e.g., small pixel-to-pixel variations) the number of bit-slices is extremely small. Highly-correlated data plus quantization produces a block of DCT AC coefficients that are either zero, or very close to zero.

Referring once again to FIG. 1 each of the individual elements of the spatial pixel array is denoted f(i,j), whereas the corresponding DCT coefficients in the frequency domain are denoted C(u,v). Using this convention, the two-dimensional discrete cosine transform can be expressed mathematically as:

$$DCT(u,v) = \sum_i \sum_j f(i,j) \cos\left(\frac{2i+1}{16} \times \pi \times u\right) \times \cos\left(\frac{2j+1}{16} \times \pi \times v\right)$$

As can be seen from the above equation, this DCT operation basically consists of a sequence of multiplications and additions performed on the image data in two-dimensions. The top row or segment of data in the image is normally coded sequentially and is either stored or distributed, then a second row or segment is coded and either stored or distributed, and so on until the entire image has been coded.

DCT is normally applied to M×N blocks of data, where M and N are integers (e.g., M=N=8). However, the DCT is a separable transform, and can be implemented as a one-dimensional transform which is first applied on the row, and then to the columns of the block. The transformation is the same for all rows. Thus, an apparatus for performing a DCT needs some way of transposing the M×N block to generate vectors of rows (i.e., columns into rows).

The discrete cosine transformation of a row of pixel data is performed by multiplying each pixel of the row by the first predefined row of coefficients, and then adding the total products for the row into a first resultant sum. A second row of coefficients is then multiplied to the row of pixels and its products summed to obtain a second resultant sum. The process is repeated until the row is complete, and then on each row until the 8×8 block is complete. For one result, it may be necessary to calculate eight multiplications of eight data values with eight different coefficients, then to sum the eight partial results. Therefore, a total of sixty-for multiplications is required to generate the eight partial results.

A forward DCT operation is performed in one dimension (i.e., columns or rows) using the following mathematical equation. Note that for an 8×8 block of pixels, this operation would have to be performed eight times (i.e., for i=0–7).

$$DCT(u) = \sum_i f(i) \cos\left(\frac{2i+1}{16} \times u \times \pi\right)$$

Practitioners in the art will appreciate that a two-dimensional discrete cosine transformation on a 8×8 block of pixels requires approximately four thousand multiplication and accumulate operations. Considering this enormous computational overhead, real-time multimedia display of a 320× 240 array of pixels on a monitor screen refreshed at a data rate of 30 times per second presents a formidable task for multimedia data processing devices.

Note that conventional data processing systems have generally been designed to only allow a single 32-bit or 64-bit data item to be processed at a time. That is, using 64-bits registers, 64-bit ALUs, etc., all the resources in the central processing unit (CPU) work on the maximum data length allowed. The present invention, on the other hand, provides an architecture optimized for performing convolutions, such as DCT, that involve a large number of multiplications and summations.

Convolution Processor Architecture

Practitioners skilled in the field of data processing will understand that convolution functions can generally be expressed in the following form.

$$OUT_i = (A_0 \times IN_i) + (A_1 \times IN_{i+1}) + (A_2 \times IN_{i+2}) + \ldots + (A_{n-1} \times IN_{i+n-1})$$

Where the input vector $IN_{i \ldots i+n-1}$ represents n elements of some input function. The vector $A_{0 \ldots n-1}$ represents a set of constants in the above equation. For unsigned input data having k bits of precision, the input values may be represented in binary notation as:

$$IN_i = 2^0 \times IN_i[0] + 2^1 \times IN_i[1] + 2^2 \times IN_i[2] + \ldots + 2^{k-1} \times IN_i[k-1]$$

Likewise, the input values for signed data, where $In_i[j]$ represents bit $j$ of the input datum $i$, may be represented in binary notation as:

$$IN_i = 2^0 \times IN_i[0] + 2^1 \times IN_i[1] + 2^2 \times IN_i[2] + \ldots - 2^{k-1} \times IN_i[k-1]$$

A key aspect of the novel technique of the present invention is the ability to transpose large quantities of data in a bit-sliced fashion, thereby allowing the requisite multiply-accumulate operations of the convolution function to be performed as a relatively straightforward series of table look-ups and additions. According to the method of the present invention, in the case of a n-sample convolution function on k-bit data, k divided by n (i.e., k/n) bits of data are taken from each of the n samples. For example, where k and n are both equal to eight (i.e., 8 different slices of 8-bit data), the operation of the present invention produces the following eight slices of data:

$$SLICE_0 = 2^0 \times IN_i[0] + 2^1 \times IN_i[0] + 2^2 \times IN_i[0] + \ldots + 2^7 \times IN_i[0]$$

$$SLICE_1 = 2^0 \times IN_i[1] + 2^1 \times IN_i[1] + 2^2 \times IN_i[1] + \ldots + 2^7 \times IN_i[1]$$

$$SLICE_7 = 2^0 \times IN_i[7] + 2^1 \times IN_i[7] + 2^2 \times IN_i[7] + \ldots + 2^7 \times IN_i[7]$$

The organization of 8×8 data in the slice architecture of the present invention is shown in FIG. 3. FIG. 3 illustrates the eight bytes as eight separate horizontal columns. Each of the individual bits (e.g., $b_0$, $b_1$, $b_2$, $b_3$, ... $b_7$) are shown as vertical columns in FIG. 3, while data bytes are denoted $B_0$, $B_1$, $B_2$, $B_3$, ... $B_7$. Data is optimally organized in the architecture of the present invention such that bit-sliced data is readily available in a form wherein $SLICE_0$ comprises bit $b_0$ from each of the eight bytes $B_0$–$B_7$ (multiplied, of course, by an appropriate constant), $SLICE_1$ comprises bit $b_1$ from each of the eight bytes $B_0$–$B_7$, and so on. In other words, the architecture of the present invention is designed specifically to allow column elements of an 8×8 block to be easily transposed into rows to simplify DCT-based algorithmic operations.

According to the present invention, a look-up is performed for each slice in a $2^k$-entry look-up table which contains all of the possible summations of the elements of the constant vector $A_{0 \ldots n-1}$. In the situation where n equals k, the table is constructed such that if bit $j$ is set in the binary representation of the table index, then the vector element $A_j$ is simply added in the summation. For example, $Table_0 = 0$  $Table_1 = A_0$  $Table_2 = A_1$  $Table_3 = A_0 + A_1$
$Table_4 = A_2$  $Table_5 = A_0 + A_2$ ...
...
... $Table_{255} = A_0 + A_1 + A_2 + A_3 + A_4 + A_5 + A_6 + A_7$ In the case where k is greater than n, the vector elements are multiplied by the value of the (k/n)-bit fields taken from the table index prior to summation.

When a look-up is performed on the above table information with the bit-sliced data, the result is the convolution of a slice of the input data with the convolution vector. In the case of an 8 slice, 8-bit data example, the result produces the following look-ups.

$$LOOK\text{-}UP_0 = A_0 \times IN_0[0] + A_1 \times IN_1[0] + \ldots + A_7 \times IN_7[0]$$

-continued
$$LOOK\text{-}UP_1 = A_0 \times IN_0[1] + A_1 \times IN_1[1] + \ldots + A_7 \times IN_7[1]$$
$$\ldots$$
$$LOOK\text{-}UP_7 = A_0 \times IN_0[7] + A_1 \times IN_1[7] + \ldots + A_7 \times IN_7[7]$$

Adding these outputs, appropriately shifted, generates the value of the convolution specified above.

$$OUT_0 = 2^0 \times LOOK\text{-}UP_0 + 2^1 \times LOOK\text{-}UP_1 + \ldots + 2^{n-1} \times LOOK\text{-}UP_{n-1}$$

Note that instead of operating on one pixel at a time (e.g., having an 8-bit value) and multiplying that datum in accordance with conventional DCT methods, the architecture of the present invention can operate on a single bit of 8 different bytes of data (e.g., each byte being 8-bits long) sliced horizontally. In the case where 8×8 data arrays are to be convolved, rather than performing eight separate multiplies for one bit, then a summation following by another eight multiplies for the next bit, and so on, the apparatus and method of the present invention can operate on 1-bit per pixel component across eight bytes simultaneously.

The approach of the present invention greatly relieves the computational burden of the data processing devices by changing convolution multiplications into relatively simple memory accesses. Complex multiplication operations which have greatly burdened prior art multimedia data processing schemes are transformed by the present invention into a table look-up in memory. It should be understood that the look-up tables store all of the possible combinations of a particular DCT component. In essence, the present invention converts eight complex multiplications into eight relatively straightforward table look-ups. Each horizontal slice of the data (one bit across eight bytes) produces a single look-up. Therefore, in accordance with one embodiment of the present invention, as multimedia data is received by the data processing engine (in conveniently sized blocks, e.g., 8×8 blocks), the minimum pixel value is first computed and stored, deltas are then calculated, and a series of look-up adds are performed for each of the eight horizontal slices of data.

Practitioners in the art will further appreciate that an advantageous feature of the architecture of the present invention is the transformation of convolutions into linear functions, i.e., a series of additions. That is, arbitrary non-linear functions are computed as a series of additions in accordance to the bit-slice convolution architecture of the present invention. This gives the data processing architecture of the present invention the ability to implement virtually all of the numerous different algorithms required for efficient multimedia data compression, decompression, and other manipulations (e.g., JPEG, MPEG, etc.).

The combination of a programmable look-up table together with a bit-sliced architecture allows the remapping of a virtually limitless number of data processing algorithms in a straightforward manner. Note that the number of parameters needed for implementing any complex function is limited only by the size of the memory which stores the look-up table information.

Not only does the present invention allow a drastic reduction in a number of mathematical operations by converting a series of multiplications into a series of look-up adds, the architecture also allows a significant reduction in the amount of data that must be processed. Recall that as one moves further down the diagonal zig-zag line in the matrix of FIG. 2, the higher the likelihood that the resulting coefficients will be close to zero or zero—especially in the situation where deltas have already been computed for each of the array entries. This makes it possible to quantize the data by placing the threshold on the DC component.

For example, if the data goes beyond a threshold level it may simply be ignored, or otherwise treated as having a value of zero. By adjusting the threshold level, it now becomes possible to achieve rapid output convergence for highly correlated data. Another way of looking at it is that by increasing the threshold level of the quantization, a greater number of higher frequency coefficients are suppressed. This feature of the present invention grants the programmer great control over the final resolution of the result.

To better understand and appreciate the present invention consider the following example. Assume that an analog waveform g(t) is digitized by taking a set of samples. To determine the energy of frequency $F_A$ that are present in g(t), it is necessary to calculate the convolution function. The different frequency components (e.g., $f_0$, $f_1$, $f_2$, $f_3$, etc.) represent the DCT coefficients that correspond to the frequencies that exist in g(t). Therefore convolution allows the determination of the energy in the waveform g(t) at any particular frequency. By way of example, the lowest frequency component, $f_0$, is given as:

$$\sum_i f_0(t) \times g_B(t)$$

where i is equal to the number of samples and $g_B(t)$ represents one byte of g(t). Knowing all the possibilities of g(t), the above function is stored in a look-up table in accordance with the present invention. The remaining components—that is, the summation of $f_1(t)$ times $g_B(t)$, etc., are also stored in look-up memory. A distinctive advantage of the present invention is that only one look-up need be performed for each horizontal slice of data, and, in that one look-up, all of the DCT coefficients, $f_0$, $f_1$, $f_2$, ... $f_n$, are immediately available.

Practitioners in the art will appreciate that the convolution architecture of the present invention affords many possibilities for greatly simplifying data processing of large amounts of multimedia data. For instance, if dynamic random-access memory (DRAMs) are employed in a computer system, a data burst may be performed in one memory cycle, and the results placed in four different registers for components $f_0$, $f_1$, $f_2$, and $f_3$ (for the first horizontal data slice).

In performing the sequence of look-ups for the individual slices, it is worth noting that the next look-up slice is essentially the previous one divided by two, so that the remaining computations are greatly simplified. As a result, complex mathematical functions are reduced to a series of additions through the utilization of a novel bit-slice architecture and look-up tables in the present invention. Note that in the example above, all that was necessary to accomplish this computational savings was to pre-compute all of the possible patterns that could be produced for f(t) and store those computations in a memory look-up table. Without a loss of generality, it is possible to perform multiple table look-ups on smaller tables.

Consider, by way of example, an eight sample convolution performed on 16-bit data. Normally, this would be accomplished by taking a 16-bit slice and then performing eight look-ups on a $2^{16}$ entry table. However, since convolution is reduced to a linear function in accordance with the present invention, it is possible to treat the data 8-bits at a time; performing an 8-bit slice on the eight most significant bits. This would be followed by eight look-ups on a $2^8$ entry table, continuing with the same procedure down to the eight least significant bits (or until a threshold has been exceeded). The two results can then be combined linearly to yield the final result.

A Novel Data Processing Engine

The method described above allows the construction of a data processor architecture that can simultaneously generate multiple outputs of a convolution of one function with another constant function. The invented data processing engine comprises N processing devices—each of which includes its own dedicated table look-up memory, a shifter/accumulator, and a communication data path to its neighboring processing device. The communication data path allows processor $P_0$ to send information to processor $P_1$; processor $P_1$ to send information to processor $P_2$; and processor $N-1$ to send information to processor $P_0$.

The N processors may simultaneously compute $OUT_0 \ldots _{n-1}$ by inputting N data, performing a bit-slice operation (as described previously), then simultaneously perform a look-up of the value of their slice, which represents the convolution of a bit vector with the convolution function at that point in the output.

For example, for a four-sample function $b_0 \ldots _3$, it is desired for processor $P_0$ to convolve input $IN_{0-3}$ with $b_{0-3}$, processor $P_1$ to convolve $IN_{1-4}$ with $b_{0-3}$, etc. The table values for each processor would be as follows.

Processor$_0$, Table$_1 = b_0$  Table$_3 = b_0 + b_1$  Table$_7 = b_0 + b_1 + b_2$
Processor$_1$, Table$_1 = 0$  Table$_3 = b_0$  Table$_7 = b_0 + b_1$
Processor$_2$, Table$_1 = 0$  Table$_3 = 0$  Table$_7 = b_0$ At the same time that a processor performs a table look-up followed by a shift and accumulate operation, it also sends the data slice information to its forward neighboring processor. Meanwhile, that processor receives the next slice from its backward neighboring processor. This means that each of the processors are immediately ready to perform a look-up on the next slice, shift the data, and accumulate the result. After N clocks, all N processors will have accumulated the value of the convolution at N different points in the input data stream. Thus, the aggregate bandwidth of the invented architecture is an unprecedented one sample per clock.

Practitioners will appreciate that some intermediate results may need to be kept at the boundaries of the N input data. Hence, the processors in the invented architecture may need to perform more than one look-up on a particular slice. In general, to do a k-sample convolution on an N-processor system requires (k+N−1)/N look-ups, rounded up, per output data.

FIG. 4 illustrates one embodiment of the present invention for a data processing engine 30 employing eight processors. Four separate data processing units $DP_0$–$DP_3$ are shown as blocks 40–43, with each data processing unit comprising two processors. In the embodiment of FIG. 4, each of the data processing units is preferably implemented as a single integrated circuit. The data processing units shown in FIG. 4 may be identical to all the others. The total number of processors in engine 30 is equal to the number of data bits; i.e., one processor for each bit. Obviously, one alternative is to fabricate all eight processors on a single integrated circuit.

Each of the data processing units 40–43 is directly coupled to its neighboring processing unit through communication channel 20. This allows neighboring processors to receive and transfer data to/from its neighboring processors in a serial fashion.

Each processor in the respective data processing units is also coupled to a pair of static random-access memories (SRAM's). For example, processor 10a of data processing unit 40 is coupled to SRAM devices $20a_1$ and $20a_2$. Similarly, processor 10b is shown being coupled to SRAM memories $20b_1$ and $20b_2$. Each of the data processing units in SRAM memories may be accessed through lines coupled to local bus interface unit 60. Interface unit 60 handles data transfer to and from local bus 31, as well as between the individual processors $P_0$–$P_7$ and their associated SRAM's. By way of example, lines 50 couple bus interface unit 60 to processors 10a and 10b and also to memories $20a_1$, $20a_2$, $20b_1$, and $20b_2$. Local bus interface unit 60 is described in more detail below.

Applying the previously described method to data processing engine 30 results in the simultaneous generation of multiple outputs of a convolution of one function with another constant function. Note that each of the N processing engines (e.g., $P_0$, $P_1$, . . . $P_7$) includes its own private look-up table memory, a shifter/accumulator, and a communications path to its neighboring processor.

Because they are relieved of much of the computational burden of performing repetitive multiplications of complex functions, processors $P_0$ through $P_7$ may have a simplified architectural core. In the embodiment of FIG. 4, each processor comprises a CPU register file, a 24-bit adder, and a 24-bit register file. This simplified data processor architecture markedly reduces the logical complexity of the processors, making it possible to integrate all eight processors on a single chip. A set of multiplexers is also included within the data processing blocks to handle information transfer between interface unit 60, SRAM devices 20–23 and processors 10–13.

Processors 10–13 are shown in FIG. 4 as having 8-bit data outputs, which allows either an 8-bit output to be transferred to all of the processors simultaneously in a parallel mode of operation, or serial pipelining of data from one processor to another neighboring processor through communications channel 20. In other words, communications channel 20 is structured in a way wherein any single processor $P_0$ through $P_7$ can send information to all of the remaining processors to allow all the processors to work on the same data at the same time. Alternatively, each processor can work on its own separate data. Every processor communicates with its associated SRAM memories for the purpose of performing look-ups and for data transfer to local bus interface unit 60.

The reason for dedicating two separate SRAM's (or a single, dual-ported SRAM) in the embodiment of FIG. 4 is as follows. To begin with, local bus interface unit 60 should be able to access all of the eight processors at any given time for the most efficient data throughput. Data access to each of the processors and memories permits unit 60 to immediately load a new task into one bank of the SRAM memories, while the processors are working on a current task using the other bank of SRAM.

For example, SRAM memories $20a_1$, $20b_1$, $21a_1$, $21b_1$, $22a_1$, $22b_1$, $23a_1$, and $23b$ might contain the data and instructions for the current data processing task (e.g., $task_t$) being performed. During the time that each of the processors 10a–13b are working on their current tasks, the next set of tasks ($task_{t+1}$) may be loaded into SRAM's $20a_2$–$23b_2$. In other words, local bus interface unit 60 can load the next programming/data tasks into SRAM's $20a_2$, $20b_2$, $21a_2$, $21b_2$, $22a_2$, $22b_2$, $23a_2$, and $23b_2$ without disturbing the execution of the current task. When each of the eight processors finishes with the first task, they can simply switch over to the second bank of SRAMs and immediately begin the next processing task. This eliminates time that is normally wasted for data transfer. Meanwhile, local bus interface unit 60 can now begin unloading the results from the previous processing cycle. In the above example, local bus interface unit 60 could unload the data from SRAM memories $20a_1$–$23b_1$ (e.g., the results of $task_t$) while processors 10a–13b continue working on the task ($task_{t+1}$) previously loaded into the bank of SRAM memories $20a_2$–$23b_2$. After the processed data has been completely unloaded, interface unit 60 can then begin loading those same SRAM's with the next task (e.g., $task_{t+2}$) in the sequence.

The reason why interface unit 60 is able to load the next task into the available (e.g., top) bank of SRAMs, is because the processors are actively working on the current task. When the current task is finished, the processors switch to the other bank of SRAM memories and begin working on that program/data task. Thus, it is appreciated that maximum data processing efficiency and maximum transfer throughput is achieved by having dual banks of dedicated SRAM memories. In a current implementation of FIG. 4, each of the SRAM's comprises a 32K×8 array of storage locations. Practitioners in the art will appreciate that complete parallel processing can be achieved with the architecture of FIG. 4 while utilizing the full bandwidth of the memory devices.

Local bus interface unit 60 comprises an integrated circuit that is connected to the host CPU, system bus, a motherboard product, or an inboard module via local bus 31. Local bus 31 comprises a high-speed local bus, such as the standard PCI local bus which provides low cost and high performance across the spectrum of personal computers—from notebooks to desktop machines to servers. The PCI local bus spans 32-bits wide and normally operates at 33 MHz, with a peak bandwidth of a 132MBytes per second. For the embodiment of FIG. 4, local bus 31 is intended to bypass slower system buses while supporting multiple peripheral devices.

Alternatively, a Video Electronic Standards Associations (VESA) VL-bus, may be used to improve the performance of graphics in a desktop computing environment.

Local bus interface unit 60 controls the transfer of data from local bus 31 into each of the processors. While each of the processors are busy processing their current tasks, local bus interface unit 60 handles data transfer to and from the processors in local bus 31. In one embodiment, interface unit 60 comprises a chip that fetches a simple command chain out of memory and executes the instructions of the command chain. Normally, such commands would direct the interface unit 60 to load data and instructions into the appropriate bank of SRAM memories in $DP_{0-3}$ so that when the processors are finished with their current task, they can begin their next task immediately.

The command chain sequence may be fetched by direct-memory-access (DMA) from system memory and loaded into a storage location within the SRMA's controlled by the processors. The command chain would include a portion which is a code loaded into each of the processors for directing the processors to perform a particular task on the data which has just been loaded by the local bus interface unit. There are a variety of tests that may be loaded by the command chain into the respective processors for the purpose of transforming or processing a block of data "A" into a block of data "B". Note that the command chain also includes information of the tasks to be performed and the time at which it is to be performed.

Consider, by way of example, the processing of a data block "A". The first task would be fetching the data from system memory and loading it into the SRAM's of the respective processors. The data is loaded into the designated bank of SRAM memories that the processors are not using at that time. Before operating on the data which just has been loaded into a bank of SRAM memory, the processors must have the processes that is to be perform loaded into the register file. The command chain therefore fetches the process and places it in a memory location so that when the processor is switched to it, they know which process it is they are to execute.

Next, a program must also be loaded that tells the processors what to do with the data block once it has been transformed into data block "B". Note that once the data has been completely processed it is loaded into an available bank of SRAM memories. At that point the command chain would include commands recognizing that the data processing task has finished so that data block "B" can be stored in a location in system memory. The retrieval of the process the data and storage into system memory is like a pending function or operation that is loaded—but not executed—until the SRAM bank switch occurs, and the results are to be emptied.

The command chain therefore specifies the overall task of where the data is to be retrieved and stored, and what particular task is to be performed on the data by each of the processors. According to the present invention, the command chain is implemented in a way that obviates interruption of the host processor. The data processing engine is constantly kept working to process data in accordance with the instructions and data provided by the command chain. The completion of one task and the beginning of the next task is specified in the command chain in an "interrupt-like" manner since the storage location of the processed data, as well as the next task in the instruction sequence, remain pending while the current task is being executed. Independent of the task that the command chain is currently instructing the processing engine to perform, the command chain can also continue to fetch new tasks via interface chip 60.

The instructions and data which comprise the command chain is initiated by the host processor, which would write a register that directs a DMA access to retrieve the entire command chain from memory.

It is appreciated that the command chain of the present invention is executed by the local bus interface chip 60 in the embodiment described above. As discussed above, each of the processors $P_0$–$P_7$ in the data processing engine 30 of FIG. 4 is configured to process data in either serial or parallel manner. That is, all of the processors can work on the same data at the same time, or each can work on different data simultaneously. In a data bit-slice mode of operation, each of the processors receives one bit of information so that in one clock cycle, eight bytes of data can be sliced horizontally as discussed in conjunction with FIG. 3. This allows all the processors to perform look-ups on one slice of data in the highly efficient manner.

For example, bit $b_0$ of bytes $B_0$–$B_7$, representing one horizontal slice of data, may be loaded simultaneously into processors $P_0$–$P_7$ during one clock cycle. After each processor does its table look-up, followed by shift and accumulate, it sends its slice to its forward neighboring processor. At the same time, that processor receives the next slice from its backward neighboring processor. The processor can then perform a look-up on the next slice, shift again, and accumulate the result. Remarkably, after eight clocks, all eight processors will have accumulated the value of a convolution at eight different points in the input stream.

With reference now to FIG. 5, there is shown a circuit schematic block diagram of an implementation of an individual data processor (representing one of the data processing elements $P_0$–$P_7$ of FIG. 4). The data processor includes a look-up table memory 75 coupled to a shifter 76, which in turn provides an input to adder 78. The other input to adder 78 is provided by the output of register file 77. The output of adder 78 is also capable of being coupled back into the register file input to facilitate the accumulation of the desired output result. Interprocessor communication channel 20 provides a data from a previous processor, or bit-slice data, into shift register 72, multiplexed by multiplexer 71. Interprocessor communication channel 20 contains all of the lines and connections between each of the processors. In a bit-slice mode of operation, every processor receives a different bit-slice and all eight processors then work on their respective slices. Afterwards, the results may be shifted to the next processor, so that processing can continue. Note that in the bit-slice mode of operation, it takes just eight clocks for all of the eight data slices to be completely processed.

Convolution Example

To better understand the operation of the present invention consider the following convolution example. Assume that there exists a stream of 8-bit data (e.g., multimedia video data) on which it is desired to perform a filtering operation. Assume that the filter is a 17-tap lowpass filter. The function to be implemented is:

$$OUT_i = (A_0 \times IN_i) + (A_1 \times IN_{i+1}) + \ldots + (A_{16} \times IN_{i+16})$$

A straightforward implementation of this function on a prior art sequential processor would require sixteen separate multiply-accumulate operations per data output, or typically on the order of eighteen clock cycles per output byte.

Assume also that the multimedia data processing system of the present invention is configured as is shown in FIGS. 4 and 5. That is, the system comprises eight 8-bit versions of the basic processor illustrated in FIG. 5. In this case, n (the number of input bits) is equal to 8 and i (the processor index) ranges from 0 to 7. Similarly, k (the number of output bits) is internally at a higher precision (e.g., 12 bits), but can be rounded before output to another range (e.g., 8 bits).

The above-convolution example may be performed in a bit-slice manner by performing the following sequence of steps. First of all, the stream of 8-bit data is read into shift register 72 of each of the processors. This step loads one byte of input data ($IN_{8*x+i}$) into the shift register 72. (In the present notation, x denotes the number of passes, while the subscript 8 denotes the first 8 bits of data.) With reference to FIG. 5, the input data is shown being provided to shift registers 72 along line 61, as selected through multiplexer 71. The input data provided on line 61 is coupled to the n processors from local bus interface unit 60.

Next, the data is bit-sliced by a read of the data from shift register 72, data path 65, to the interprocessor communication channel 20. The data bits are then coupled back to shift registers 72 through data path 63, as selected by multiplexer 71. By way of example, after a first bit-slice operation there will be an 8-bit byte consisting of all the bit i's of the input bytes from $IN_{8*x}$ to $IN_{8*x+7}$.

The next sequence of steps is performed eight times (with j ranging from 0 to 7) and involves:

(a) perform a look-up on the input slice and shifting it right by (8+j−i) mod 8-bits. The result is placed in register $R_0$ (see FIG. 6); it represents the convolution of the 8 bits with coefficients $A_{0-i}$ to $A_{7-i}$. Note that the look-up is performed in look-up table memory 75, the shift operation is performed by shifter 76, the ADD operation is performed by adder 78, and the result is accumulated into register file 77;

(b) perform a look-up and shift operation to get the convolution with coefficients $A_{8-i}$ to $A_{15-i}$. This result is added to register $R_1$, as shown in FIG. 6;

(c) perform look-up and shift operation to produce the convolution with coefficients $A_{16-i}$ to $A_{23-i}$. The result is added to register $R_2$;

(d) for j ranging from 0 to 7, load the shift register with the output of processor (i+7) mod 8; that is, rotate the bit-slice data to the next adjacent processor. Note that this is accomplished via interprocessor communication channel 20, with the data from the previous processor being multiplexed into shift register 72 through lines 62.

After the above operations have been performed (with j ranging from 0 to 7) the top bits from register $R_0$ may be output as $OUT_{8*x+5}$. FIG. 6 illustrates the output for the first 8 bits as $OUT_{0-7}$. Next, the results are shifted R1 to R0 followed by R2 to R1. As data is processed and moved from left to right in the example of FIG. 6, a zero (or a rounding coefficient) is moved to R2.

Practitioners in the art will appreciate that the invented method and apparatus for performing convolutions reads 8 input bytes at a time, processes them in the manner described above, and then outputs 8 bytes. The total time of processing the 8 bytes of information in this example, is 28 clocks, or 3.5 clocks per output byte. Thus, the architecture of the present invention dramatically increases real-time multimedia data processing efficiency.

Further recognize that with each pass of the algorithm, the data processing engine of the present invention produces eight outputs—corresponding to the convolution of the eight inputs with eight different shifts of the filtering function. Since, for our example, the filter is 17 samples wide, each input is looked-up three times (once for each part of the filter). The output is delayed by the width of the filter. This is illustrated in FIG. 6.

Early Termination Slicing

Instead of having each processor work on a different bit slice, an alternative mode of operation is to have all of the processors work on the same data slice at the same time. This is referred to as a "broadcast" or "early termination slicing" mode of operation. The advantage of this latter mode of operation is that if the data is statistically close to zero, then a significantly reduced number of slices need only be processed. Thus, the early termination slicing operating mode has the advantage of greatly reducing the computation time by reducing the amount of data slices that need to be processed in situations where the data is highly correlated.

For example, in processing 16-bit audio data, it might be possible to perform delta operations on the data to reduce the precision of the data to just four or five bits. In this mode of operation each processor sends bit zero of its data to all the other processors such that all processors end up with $Slice_0$. Note that in one implementation of the broadcast mode, the bit zero data is coupled to MUX 71 through data line 64 (see FIG. 5).

With reference to FIG. 3, processor $P_0$ would receive a bit $b_0$ from byte $B_0$, processor $P_1$ would receive bit $b_0$ from byte $B_1$, and so on. Each of the processors then would shift their input data (multiplexed through MUX 71) and perform slice look-ups again—this time all the processors would produce results for $SLICE_1$. Processing would continue in this manner until all eight data slices, corresponding to eight bits of data, have been processed, or, until the terminal slice has been detected.

To reiterate, the advantage of the early termination slicing approach is that it allows the processors to process fewer slices in cases where data is probabilistically centered near zero. Again, this allows the invented computer system to take advantage of the statistically similarities of input data to reduce the computational workload.

In the embodiment of FIG. 4, termination slice detection logic unit 73 is utilized to detect whether a processor has reached the final slice. For instance, if all that is being shifted out is a sign bit of a number, shift register 72 will contain either all 1's or all 0's. When this point is detected, the processor has shifted out as many significant bits as there were in the original data, and further processing becomes unnecessary. Eventually, all of the processors $P_0$–$P_7$ will have either all 1's or all 0's in their shift registers. When this happens, terminal slice detection logic unit 73 outputs a single bit on line 74 that indicates the computation is finished. (It is appreciated that all the terminal slice outputs on line 74 from all of the i processors get ANDed together and then sent back to each of the processors as a signal to indicate whether or not the terminal point has been reached for the entire data processing engine.)

Recall that the technique of subtracting the minimum value of a block (i.e., taking deltas) may be advantageously employed in order to reduce the magnitude of the numbers so that fewer slices need be processed by engine 30.

As an example of the terminal slice mode of operation, suppose the input data is 8-bit sliced, and appears as shown below.

| | |
|---|---|
| $processor_0$: 00001010 | $processor_1$: 00000010 |
| $processor_2$: 11111110 | $processor_3$: 00000000 |
| $processor_4$: 00001110 | $processor_5$: 11111101 |
| $processor_6$: 00000011 | $processor_7$: 00000001 |

This data can be reduced to four slices, plus a sign slice as shown below.

| $slice_0$ | $slice_1$ | $slice_2$ | $slice_3$ | $slice_{sign}$ |
|---|---|---|---|---|
| 00000111 | 11101010 | 00101100 | 10101100 | 00100100 |

Note that for this example, the computation has been reduced to only five look-ups instead of eight. This means that the processors can determine the terminal slice "on-the-fly" by examining their input data as it is being shifted into shift register 72. If the input data string is all 0O's or all 1's, then the processor knows that its datum is composed only of the sign; it then outputs a single Boolean bit on line 74. Logical ANDing of all of the bits on lines 74 from all processors determines whether data processing engine 30 has reached the terminal slice; if so, that determination can be fed back to each of the processors to end the current processing session.

Computer Architecture

FIG. 7 is high level block diagram of a computer architecture comprising a host processor 80 coupled to a dedicated cache memory 81 and dynamic random-access memories (DRAMs) 82. Processor 80 is coupled to high-speed CPU interconnect bus structure 21, which may comprise a standard PCI local bus. Host processor 80 coordinates data transfer along high-speed local bus 31 to and from each of the peripheral I/O or expansion devices. These devices are most often coupled to local bus 31 through expansion slots or connectors (not shown).

For example, Small Computer System Interconnect (SCSI) interface 84 provides coupling to various SCSI equipment, such as hard disk memory 85, to facilitate storage and retrieval of information. Interface 84 may also provide coupling to other SCSI equipment such as CD-ROM, tape backup drives, floppy drives, fax/modems, etc. Similarly, local area network (LAN) interface card 87 provides communicate to Ethernet local area network 88. Expansion bus interface 95 provides communication with other system level devices, including other processors, across system bus 100. System bus 100 may comprise almost any industry standard bus such as an ISA bus, EISA bus, MicroChannel™ bus, TurboChannel™ bus, etc.

Base I/O interface 90 provides coupling of input/output devices such as keyboard 91, mouse 92, PCMCIA card 93, etc., to high-speed local bus 31 and general-purpose host processor 80. Also shown coupled to high-speed local bus 31 is a graphics processor card 96 that includes high-speed video random-access memory (VRAM) 97, and which is responsible for displaying information on a connected monitor 94. Optional audio/video functions may be provided by block 99, which, by way of example, can typically drive external speakers or audio amplifiers. Audio/visual function block 99 is also shown coupled to local bus 31.

Of course, many other types of existing peripheral devices can be connected to local bus 31. Such devices are widely available, or can be made compatible with local bus 31 through relatively simple modifications.

Multimedia data processing engine 30 interfaces with high-speed local bus 31 via interface 60. In the system configuration of FIG. 7, processor 80 would normally utilize the digital signal processing ability of engine 30 to implement the various multimedia algorithms and convolution techniques previously discussed to achieve real-time data processing.

Whereas many alternations and modifications to the present invention will doubt become apparent to a person of ordinary skill in the art after having read the foregoing description, is to be understood that particular embodiment shown and described by way of illustration are in no way intended to be limiting. Therefore, reference to the details of the illustrated diagrams is not intended to limit the scope of the claims which themselves recite only those features regarded as essential to the invention.

What is claimed is:

1. A method for processing data involving a convolution on k-bit data, wherein an input data vector, $IN_0, IN_1, \ldots, IN_{n-1}$, represents n elements of an input data signal, with each of the n elements being represented as $$IN_i = 2^0 \times IN_i(0) + 2^1 \times IN_i(1) + \ldots \pm 2^{k-1} \times IN_i(k-1)$$

and where the convolution results in an output data-vector expressed as $$OUT_i = (A_0 \times IN_i) + (A_1 \times IN_{i+1}) + \ldots + (A_{n-1} \times IN_{i+n-1})$$

wherein $A_0, A_1, \ldots, A_{n-1}$ represents a constant vector and where i, k, and n are integers, the method comprising the steps of:

(a) providing a sequence of slices of input data wherein a first slice is represented as $$SLICE_0 = 2^0 \times IN_i(0) + 2^1 \times IN_i(0) + \ldots + 2^{n-1} \times IN_i(0)$$

and a second slice is represented as $$SLICE_1 = 2^0 \times IN_i(1) + 2^1 \times IN_i(1) + \ldots + 2^{n-1} \times IN_i(1)$$

with the sequence of data slices continuing up to a nth slice represented as:

$$SLICE_{n-1} = 2^0 \times IN_i(k-1) + 2^1 \times IN_i(k-1) + \ldots + 2^{n-1} \times IN_i(k-1)$$

(b) performing for each slice of the sequence, a look-up in a $2^k$-entry table to produce a sequence of look-up values, the table containing summations of the constant vector such that each look-up results in the convolution of one slice of the input data vector with the constant vector;

(c) performing a summation of the sequence of look-up values to generate the output data vector.

2. The method according to claim 1 wherein a first look-up value is represented as $$LOOK\text{-}UP_0 = A_0 \times IN_i(0) + A_1 \times IN_{i+1}(0) + \ldots + A_{n-1} \times IN_{i+n-1}(0)$$

and a second look-up value is represented as $$LOOK\text{-}UP_1 = A_0 \times IN_i(1) + A_1 \times IN_{i+1}(1) + \ldots + A_{n-1} \times IN_{i+n-1}(1)$$

with the sequence of look-up values containing up to a nth look-up value represented as $$LOOK\text{-}UP_{n-1} = A_0 \times IN_i(k-1) + A_1 \times IN_{i+1}(k-1) + \ldots + A_{n-1} \times IN_{i+n-1}(k-1)$$

3. The method according to claim 2 further including, prior to the summing step, the step of:

shifting each look-up value by (k/n) bits, beginning with the second look-up value.

4. The method according to claims 1, 2 or 3 wherein k=8 and n=8.

5. The method according to claim 1 further comprising the initial steps of:

calculating a minimum value of the input data vector;

subtracting the minimum data value from the n elements of the input data vector.

6. A method for processing multimedia data in a computer system which includes a host processor, a system memory, a data processing engine comprising n processing devices and a system bus accommodating transfer of data and instructions, the method comprising the steps of:

retrieving n bytes of 8-bit data from the system memory;

loading each of the n bytes of data into a respective one of the n processing devices with each byte representing an element $IN_i$ of an input data vector $IN_0, IN_1, \ldots, IN_{n-1}$, where $IN_i = 2^0 \times IN_i(0) + 2^1 \times IN_i(1) + \ldots \pm 2^7 \times IN_i(7)$ outputting one bit from each of the n bytes associated with the respective processing devices, resulting in an n-bit data slice;

performing within each of the n processing devices a convolution on the n-bit data slice with a constant vector having element $A_0, A_1, \ldots A_{n-1}$, all of the possible summations of the elements of the constant vector being stored in a table memory within each of the respective processing devices.

7. A data processing apparatus comprising:

n data processing devices, each of which includes a means for organizing input data into bit slices such that each of the n data processing devices processes one bit of information from n data samples, each of the n data processing devices having a table memory containing combinations of a constant function, with each of the n processing devices performing look-up operations in the table memory for a bit slice the look-up operations producing look-up vectors: each of the n processing devices also including means for shifting and accumulating the look-up vectors to simultaneously generate multiple outputs of a convolution of the input data with the constant function; and a data path coupled to each of the data processing devices providing information transfer between each of the n data processing devices.

8. The data processing apparatus of claim 7 wherein each data processing device includes an interface coupled to the data path which allows an ith processor, where i is an integer ranging from 1 to n, to send an output of the convolution of the bit slice to an $(i+1)^{th}$ processor and receive data for a next bit slice from an $(i-1)$th processor.

9. The data processing apparatus of claim 7 wherein the multiple outputs of the convolution are generated in a single clock cycle.

10. The data processing apparatus of claims 8 or 9 wherein k=n=8.

11. A method for performing convolutions on a pixel array comprising k bytes of n-bit data elements comprising the steps of:

(a) calculating a minimum value of the pixel array;

(b) subtracting the minimum data value from each data elements of the pixel array to produce a suppressed array;

(c) organizing the suppressed array such that the k bytes, $B_0$ through $B_{k-1}$, are arranged in columns and the bits, $b_0$ through $b_{n-1}$, are arranged in rows, wherein a first row represents a first data slice, $SLICE_0$, comprising bit $b_0$ of bytes $B_0$–$B_{k-1}$, a second row represents a second data slice, $SLICE_1$, comprising bit $b_1$ of bytes $B_0$–$B_{k-1}$, and so on;

(d) performing for each slice, a look-up in a $2^k$-entry table to produce a sequence of look-up values, the table containing summations of a constant vector, $A_0, A_1, \ldots, A_{n-1}$, such that each look-up results in a convolution of one slice of the suppressed array with the constant vector;

(e) performing a summation of the look-up values to generate an output convolution data vector.

12. The method according to claim 11 further comprising the step, prior to step (e), of:

shifting each look-up value by (k/n) bits, beginning with the second look-up value.

13. A system for processing data involving a k-sample convolution, wherein an input data vector, $IN_0, IN_1, \ldots, IN_{n-1}$, represents n elements of an input data signal, with each of the n elements being represented as $$IN_i=2^0 \times IN_i(0)+2^1 \times IN_i(1)+\ldots \pm 2^{k-1} \times IN_i(k-1)$$

and where the convolution results in an output data vector expressed as $$OUT_i=(A_0 \times IN_i)+(A_1 \times IN_{i+1})+\ldots +(A_{n-1} \times IN_{i+n-1})$$

wherein $A_0, A_1, \ldots, A_{n-1}$ represents a constant vector and where i, k, and n are integers, the system comprising:

n data processors, each including a $2^k$-table memory and a shifter/accumulator;

a communication channel serially coupling the n data processors so as to allow a processor to transfer data to a neighboring processor;

an interface unit coupled with the n data processors to provide data access to the n data processors;

wherein, in a bit-slice mode of operation, the n data processors operate in a first clock cycle on a first slice of input data represented as $$SLICE_0=2^0 \times IN_i(0)+2^1 \times IN_i(0)+\ldots +2^{n-1} \times IN_i(0)$$

and in a second clock cycle on a second slice represented as $$SLICE_1=2^0 \times IN_i(1)+2^1 \times IN_i(1)+\ldots +2^{n-1} \times IN_i(1)$$

continuing to a nth clock cycle on a nth slice represented as:

$$SLICE_{n-1}=2^0 \times IN_i(k-1)+2^1 \times IN_i(k-1)+\ldots +2^{n-1} \times IN_i(k-1)$$

each of the n data processor performing for each slice, a look-up in the $2^k$-entry table memory to produce a sequence of look-up values, the table containing summations of the constant vector such that each look-up results in the convolution of one slice of the input data vector with the constant vector, the sequence of look-up values being summed by the shifter/accumulator to generate the output data vector.

14. The system of claim 13 wherein a first look-up value is represented as $$LOOK\text{-}UP_0=A_0 \times IN_i(0)+A_1 \times IN_{i+1}(0)+\ldots +A_{n-1} \times IN_{i+n-1}(0)$$

and a second look-up value is represented as $$LOOK\text{-}UP_1=A_0 \times IN_i(1)+A_1 \times IN_{i+1}(1)+\ldots +A_{n-1} \times IN_{i+n-1}(1)$$

with the sequence of look-up values containing up to a nth look-up value represented as $$LOOK\text{-}UP_{n-1}=A_0 \times IN_i(k-1)+A_1 \times IN_{i+1}(k-1)+\ldots +A_{n-1} \times IN_{i+n-1}(k-1)$$

15. The system of claim 14 wherein the shifter/accumulator comprises:

a register file;

a shifter coupled to the table memory for shifting each look-up value by (k/n) bits, beginning with the second look-up value; and an adder having a first input coupled to an output of the shifter and a second input coupled to an output of the register file, the adder also having an output coupled to an input of the register file.

16. The system of claim 13 wherein, in an early-termination slice mode of operation, each of the n data processors simultaneously operate on a single bit on data from different byte, and further comprising early-termination logic for detecting when a final slice has been processed.

* * * * *